United States Patent Office 3,171,831
Patented Mar. 2, 1965

3,171,831
THIOLATION OF PROTEINS BY REACTION WITH HOMOCYSTEINE THIOLACTONE IN THE PRESENCE OF TERTIARY AMINE
Bernard William Town, Mount Vernon, N.Y., assignor to Schwarz Bioresearch, Inc., Mount Vernon, N.Y., a corporation of New York
No Drawing. Filed Feb. 14, 1961, Ser. No. 89,131
6 Claims. (Cl. 260—117)

This invention relates to new and useful improvements in the thiolation of polymers and is a continuation-in-part of my copending application Serial No. 26,429, filed May 3, 1960, now abandoned. The invention more particularly relates to a novel process for introducing thiol groups (SH radicals) into polymer molecules containing $NH_2$ groups, such as into protein molecules, and to certain novel products produced by the process.

The SH radical or group referred to as a sulfhydryl or thiol radical or group imparts many interesting and desirable characteristics to certain naturally-occurring materials. These sulfhydryl groups, for example, are found in many enzymes which are useful for digesting or otherwise modifying biochemical compounds and in a variety of proteins found in living cells, such as serum albumin, hemoglobin, and insulin.

Under appropriate conditions, the sulfhydryl radicals may oxidize to form disulfide bridges or cross-links between adjacent molecules, thus building natural polymers of considerable size and strength as occur in proteins such as keratin, which is the principal constituent of hair and wool. These radicals further are capable of acting as reducing agents and as chelating agents.

In view of these highly interesting and desirable characteristics, attempts have been made to artificially introduce these thiol groups into natural polymers which do not normally contain the same, as for example proteins which do not normally contain the thiol groups. These attempts were not too successful from a commercial standpoint in that the procedures involved were rather difficult, cumbersome and expensive, and rather inefficient, and the success was more or less limited to the introduction of the thiol group into a relatively low molecular weight material, such as a very degraded gelatin or polypeptides.

One object of this invention is a simplified, rapid, economical and essentially one-step process for the introduction of thiol groups into polymers containing $NH_2$ groups. A further object of this invention is a novel process for thiolating proteins, such as gelatin, which avoids the prior art disadvantages and may be used for the thiolation of higher molecular weight proteins.

A still further object of this invention is the production of certain novel thiolated polymers.

A still further object of this invention is the conversion of at least the surface of solid or gelled polymers containing available free amino groups into an insoluble and heat-stable form by the formation of disulfide cross-links.

These and still further objects will become apparent from the following description:

The thiolation in accordance with the invention is effected by reacting the polymer to be thiolated containing the free $NH_2$ group with a thiolactone while maintaining the pH of the reaction solution above the pK value for the reactive amino group on the polymer by the presence of a tertiary amine.

The reaction proceeds in accordance with the following reaction scheme:

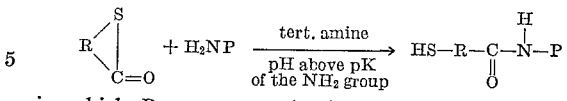

in which R represents the hydrocarbon or substituted hydrocarbon portion of the thiolactone and P represents the polymer molecule.

As may be noted, the reaction proceeds with a splitting of the lactone ring between the sulfur atom and carbonyl group and with a joining of the split bond at the carbonyl group with the nitrogen atom of the amino group which replaces one of the hydrogen atoms which migrates to the split sulfur bond, forming the thiol group. The portions R and P, therefore, do not actually enter into or contribute to the reaction mechanism and thus may not be considered critical. It is therefore perfectly clear and obvious that any of the materials falling under the above general formula will be operable in accordance with the invention. Thus, any polymer molecule having a free $NH_2$ group may be thiolated in accordance with the invention. This includes any of the polymers having naturally occurring $NH_2$ groups, such as the various proteins, enzymes or nucleic acids, or any polymer which may be aminated so as to attach a free $NH_2$ group. The reaction is effected in a polar reaction media, as for example in an aqueous or alcoholic media.

In order to obtain an SH group containing reaction product which does not differ substantially from the unthiolated polymer in physical characteristics, such as its gelling characteristics, solubility, temperature resistance and the like, the starting polymer should be dissolved so that the reaction is effected in a homogeneous reaction media, i.e., in the form of reaction solution. These physical characteristics may of course be subsequently changed by conversion of the introduced thiol groups to disulfide bonds, as hereinafter described, but the reaction product directly recovered from the thiolation reaction contains the free thiol groups. In connection with polymers which do not readily dissolve, dissolving intermediaries may be used.

In order to directly obtain a reaction product whose physical properties are altered with respect to the starting unthiolated polymer, as for example with respect to solubility, temperature resistance and the like, the starting polymer should not be dissolved in the reaction media, so that the reaction is effected in a heterogeneous reaction media. In this latter case the polymer, in gelled or solid form, may be dispersed in the reaction media, may be swelled with the reaction media, or its surface merely contacted with the reaction media, as for example by being immersed in a solution of the other reactants. Where reaction is effected with the polymer dispersed, dispersing agents may be used.

The lactone may be any known or available thiolactone, as for example alpha, beta, gamma or delta lactones, or substituted alpha, beta, gamma or delta lactones. Due to the enhanced stability of their rings and availability, the gamma and delta thiolactones are most commonly used.

The presence of the tertiary amine is critical for the thiolation reaction in accordance with the invention when effected in the homogeneous phase. Any tertiary amine, however, may be used provided that the same is capable of maintaining the pH value of the reaction solution above the pK value of the reactive amino group. In connection with the thiolation of proteins, such as gelatin, the reactive amino group is the epsilon-amino group on the lysine moieties, the pK value of which is about 10.5. In connection with thiolating these proteins, lower tertiary amines are preferable.

In connection with the reaction in a homogeneous reaction media, i.e. with the starting polymer dissolved, the subsequent cross-linking of the thiolated polymers by the oxidation conversion of the thiol groups to disulfide bonds, is believed to be activated by the presence of at least trace amounts of certain metal ions, such as $Cu^{++}$ and $Fe^{++}$ ions. The tertiary amines used in the thiolation reaction in accordance with the invention, however, may act as a binding agent for these ions, so that if a cross-linkable product is to be obtained, amines which will readily separate from the thiolated polymer must be used or amounts of the activator metal ions added to the end product in excess of the amount bound by the retained tertiary amine. As only a trace quantity of these metal ions is required in order to activate the cross-linking, it is merely necessary to add an amount of these metal ions, so that this trace in excess of the amount bound is present. The maximum amount of metal ions which should be present is merely dictated by practical considerations, such as the economy of adding more than is required for the activation and the contamination of the product by this material. Also in the homogeneous reaction medium the tertiary amines serve as excellent buffering agents to maintain the pH of the reaction solution at a maximum value for the thiolation, while at the same time retarding the formation of disulfide linkages. This also results in a favorable ratio of the desired thiolation reaction to undesired side reactions, such as hydrolysis of the thiolactones and formation of insoluble products.

Very surprisingly it has been discovered that if the starting polymer being thiolated in accordance with the invention is in a solid, such as a gelled state, and the reaction is effected in a heterogeneous reaction mixture, the introduction of the thiol groups is greatly favored and the use of the tertiary amine is not critical. Thus, when operating with the heterogeneous reaction mixture, the pH may be adjusted with the use of any alkaline material, as for example, sodium hydroxide, potassium hydroxide, sodium metasilicate, lime, trisodium phosphate, sodium carbonate, ammonia, magnesia, lithium hydroxide, or the like, or organic bases, such as primary or secondary amines.

When the reaction is effected with the heterogeneous reaction mixture the same generally proceeds directly through the point where the disulfide cross-links are formed, and the presence of the materials which will normally inhibit the cross-linking in the homogeneous system, such as the tertiary amines mentioned above, will not show any noticeable inhibition effect in this heterogeneous system, though it may be possible to inhibit the formation of the disulfide cross-linking bonds by the use of a suitable stronger, cross-linking inhibitor, such as a strong reducing agent.

In general, for operation in a homogeneous reaction mixture, the procedure is carried out by dissolving the polymer containing the free amino group to be thiolated in water or another polar solvent with the concentration merely being limited by practical considerations, such as the viscosity, it being desirable to keep the solution sufficiently free-flowing for a thorough mixing of the other reactants. The tertiary amine is then added in an amount sufficient to raise the pH of the reaction media above the pK value of the amino group to be thiolated. The thiolactone is then added, either as a solid or liquid, and contacted with the polymer, as for example by stirring. Additional tertiary amine may be added from time to time in order to maintain the required pH. The amounts of the reactants, other than the tertiary amine, are not critical and generally depend on the number of available free $NH_2$ groups to be thiolated and the number of thiol groups which it is desired to incorporate. Theoretically, for complete thiolation of all the active $NH_2$ groups, one mol equivalent of thiolactone should be present per active $NH_2$ group, though an excess may be desirable. If it is desired to introduce a lesser amount of thiol groups, then of course a correspondingly lesser amount of the thiolactone may be used. The temperatures and pressures of course are not critical, but it is usually desirable to maintain a temperature fairly low without adversely affecting the physical characteristics of the reaction mixture, as for example, freezing the same. At excessively high temperatures, undesirable side reactions, such as hydrolysis which may adversely affect the degree of thiolation, may occur. The optimum temperature may, however, be readily determined with respect to the particular reactants and is, for example, between about 0 and 50° C. in connection with the thiolation of proteins, such as gelatin. The reaction generally proceeds to completion in an hour or less, which may be indicated by a stabilization of the pH without further addition of the tertiary amine. The solution is then preferably acidified to a pH below the pK value and most preferably in the acid pH range, by using a suitable dilute mineral acid. Thereafter the thiolated polymer is separated from the reaction media in any known or desired manner for such separation, as for example extraction, fractionation, precipitation, or the like.

Preferably the separation of the thiolated polymer from the other reactants is effected by selective precipitation, effected by the addition of a solvent for the other reactants and a non-solvent for the thiolated polymer or vice versa.

The recovered thiolated polymer may be washed and purified in the conventional manner and may generally be maintained and stored in the dry state.

Operation in a heterogeneous reaction mixture is effected in a similar manner except that the polymer is not dissolved and the pH may be adjusted with any base. The polymer can thus be dispersed in finely divided form in the water or polar liquid or the solid polymer body may be immersed in such liquid. The pH is then adjusted to above the pK value of the amino group to be thiolated, as for example between 9.5 and 11.5, by the addition of the base. The thiolactone is then added and the polymer maintained in contact with the liquid reaction media, as for example with stirring, until the reaction is complete. All other conditions are substantially the same as when effecting the reaction in a homogeneous reaction media, except of course where the polymer is to remain solid, the temperature must be maintained below the melting temperature of the polymer. The reaction may be completed in as little as 1–3 minutes, when very thin films or small granules are treated, or can be allowed to proceed for an hour or more where deeper penetration is required and/or where lower temperatures are used. After completion of the reaction, the reaction reagents are washed from the treated polymer. The thiolation and cross-linking will only proceed in the areas where the polymer has been contacted with the reaction solution, so that where complete penetration or swelling of the polymer with the liquid has not occurred, only the surface area to the depth of penetration will be so treated.

The process in accordance with the invention is particularly interesting for the thiolation of proteins, such as gelatin, as it allows introduction of the thiol groups into the protein in a simple manner with a short reaction time, a minimum of protein degradation, favorable stoichiometric, the avoidance of any reagents which are known to be unsafe for use with physiological materials, and since it allows for the first time the thiolation of the higher molecular weight proteins, such as the higher molecular weight gelatins, producing a novel group of materials. The starting protein is preferably water-soluble, as for example a water-soluble gelatin, which is dissolved in water to a concentration which is primarily limited by the solubility and viscosity of the mix and the gelling tendencies, it being desirable to keep the solution sufficiently free-flowing for thorough mixing with the other reactants. Upon completion of the solution of the protein an appropriate tertiary amine is added until the pH is above 10.5–11, the pK value of the free epsilon-amino lysine moieties.

Preferable amines include trimethyl amine, triethyl amine and diethylethanol amine. Higher amines, including the cyclic amines, such as N-methyl piperidine, N-methyl morpholine, may also be used but in view of the difficulty in the separation from the thiolated protein a readily cross-linkable product may not be obtained.

The thiolactone is then immediately added, in either liquid or solid form, and the reaction mixture thoroughly stirred so as to avoid incorporation of air until the solution has become clear. Enough additional tertiary amine is added from time to time during the reaction to maintain a pH of 10.5 or above.

The reaction is generally completed in about one hour or less, as indicated by stabilization of the pH without further addition of the base. The solution is then promptly acidified to a pH below 6 by adding a suitable dilute mineral acid. Subsequently, approximately one volume of acetone is added slowly to the reaction mixture until a slight turbidity develops.

The turbid solution is then rapidly transferred into approximately four times its volume of chilled anhydrous acetone, whereupon a fine white flocculent precipitate is formed, which is allowed to settle. The supernatant is decanted after settling has taken place and the precipitate dehydrated by the addition of fresh chilled anhydrous acetone. The slurry so formed is rapidly filtered, washed with dry acetone, and dried in a vacuum oven.

The above procedure allows the formation of a high bloom gelatin having a molecular weight of at least about 100,000 and containing 2–25 thiol groups per mol. This gelatin is stable in solution in acid pH, but will readily cross-link in alkaline solution in a pH range preferably between 8 and 10, forming a corresponding number of disulfide cross-links. The cross-linking is caused by oxidation and may be accelerated by the addition of an oxidizing agent, such as potassium ferri-cyanide, hydrogen peroxide, ammonium persulfate, ammonium perborate, or the like, though the gelatin solution generally contains enough dissolved oxygen to cross-link within a few minutes to form an insoluble product. Breaking the cross-linking bonds can be achieved by cleaving the disulfide bonds, as for example, by the addition of suitable materials, such as thioglycollic acid, and beta mercapto ethylamine, or by ultraviolet radiation or the like. The thiolated gelatin produced in accordance with the invention may be used in any application where conventional gelatin is used, but as contrasted to conventional gelatin, may be set with the cross-linking forming a product which is insoluble in boiling water, which is much more rigid, has a higher bloom number, and a much higher apparent molecular weight due to the cross-linking bonds. The novel thiolated gelatin in accordance with the invention having a molecular weight of about 100,000 as determined by intrinsic viscosity and from 2 to 25 thiol groups per mol, may be used as a vehicle for pharmaceuticals, a potential protective agent against radiation, in the preparation of absorbent surgical sponges, sutures, medicated dressings, plasma extenders, medicated water-proof packs, for the preservation of foods, for hair setting bases, fingernail polishes, in photography in place of or in addition to conventional gelatin, specialized finishes, coatings, as a solidifying agent, special nutrient, for the preservation of seeds for planting, the manufacture of shatter-proof glass and the like. The adhesion bond of the cross-linked gelatin in accordance with the invention in most materials is extremely strong. In addition to the thiolation of gelatin in accordance with the invention, thiolation of proteins, such as casein and papain, is of particular interest. In the same manner as with the gelatin, it is possible to produce a novel modified casein containing 2–22 equivalents of —SH groups per 100,000 grams.

The reaction in the heterogeneous reaction mixture is particularly suitable for rendering gels or films of proteins and polypeptides or other polymers containing available free amino groups, insoluble and heat-stable, by introducing in a single step disulfide crosslinks. This embodiment of the invention is useful for the treatment of polymers, such as animal glue, gelatin films, granules and capsules, hides, wood, paper and textile surfaces previously treated for the introduction of free amino groups. Thus, for example, gelatin capsules containing sensitive compounds, such as drugs, nutrients or special chemicals, may be rendered more resistant to heat and moisture. Furthermore, gelatin-coated tablets or capsules may be treated for retarding their disintegration in the stomach while leaving them readily digestible in the intestinal tract and thus provided with an improved enteric coating. Also the cross-linked gelatin in finely divided form may be used as a fining agent for the purification of liquids, such as beverages. When used in this connection it is just as effective for removing the undesired impurities as uncross-linked gelatin, but has the advantage of occluding less of the liquid being purified and thus results in a substantial reduction of the loss of this liquid.

Still further natural or synthetic fibers containing available amino groups, such as collagenous fibres, as are found in surgical sutures, tennis racquet strings and the like, may be rendered more resistant.

The following examples are given by way of illustration and not limitation:

*Example 1*

A 100 ml. solution of 5% gelatin (250 bloom) is treated with 2.5 ml. of triethylamine at 27 degrees C. to bring the pH to 10.5–11.0. 300 mgms. of N-acetyl homocysteine thiolactone are added and the solution stirred. After 90 minutes with occasional small additions of trimethylamine to maintain the pH, the solution is acidified with 5 N hydrochloric acid to pH 3.0–3.5, and then transfered into 400 ml. of acetone cooled with Dry Ice to −30° C. The thiolated gelatin is precipitated. The temperature is allowed to rise to −10° C. when the thiolated gelatin settles out. The supernatant acetone is decanted and the residue treated with 100 ml. acetone at which time the powder becomes flocculent. The powdered thiolated gelatin is washed twice by decantation and twice after filtering, using fresh actone each time. The powdered thiolated gelatin is dried in vacuo. The yield of dried powder is 4.50 grams (90%) with 21 equivalents of —SH per 100,000 grams of the thiolated gelatin (iodoacetamide titration). Stoichiometry of this reaction is (molar ratio) excellent as only 1.8 mols of N-acetyl homocysteine thiolactone are required to insert each mole of sulfhydryl group into the final product. The thiolated gelatin dissolves in warm water to form a clear solution, even at a 20% concentration, at its natural pH of 3.5–4.0. Upon adjustment of the pH to 9.0 with NaOH and addition of $K_3Fe(CN)_6$, the jelled thiolated gelatin becomes cross-linked and water-insoluble in temperatures up to 100° C. as shown by its insolubility when placed in boiling water for two minutes.

When the example is repeated, using in place of the aqueous solution an alcoholic solution and an acetone solution respectively, comparable results are obtained except in the case of the alcoholic solution, where the degree of thiolation is somewhat reduced.

*Example 2*

The conditions described in Example 1 are repeated except for incubation at 5° C. for two hours and the use of 1.12 grams of relatively low molecular weight (75 bloom) gelatin. Titration shows 24 SH groups inserted per 100,000 molecular weight of final product with a molar ratio of 5.8. Cross-linking can be demonstrated by insolubility in boiling water.

*Example 3*

The conditions described in Example 1 are repeated except for incubation at 5° C. for 22 hours and the use of 75 bloom gelatin. Titration shows 24 SH groups inserted per 100,000 molecular weight of final product with a molar ratio of 5.8. Cross-linking can be demonstrated by insolubility in boiling water.

*Example 4*

The conditions described in Example 1 are repeated except for incubation at 25° C. for one-half hour using 150 mgs. of N-acetyl homocysteine thiolactone and adjustment of pH with triethylene diamine. Titration shows only 17 SH groups inserted per 100,000 molecular weight of product but final product is not cross-linked as shown by instantaneous liquefaction in boiling water following oxidation by $K_3Fe(CN)_6$.

*Example 5*

The conditions described in Example 4 are repeated except that 0.2 g. triethylene diamine plus 5 ml. N NaOH are used to adjust the pH to 11.0. Only 13.2 SH groups are inserted and no cross-linking occurred, as shown by the oxidation and boiling water test.

*Example 6*

The conditions described in Example 4 are repeated except for pH adjustment to 10.6 with N-methyl piperidine. Titration shows only 13.4 SH groups inserted and no cross-linking resulted.

*Example 7*

The conditions described in Example 4 are repeated except for adjustment of pH to 11.0 with trimethylamine. Titration shows 13 SH groups inserted and cross-linking resulted as demonstrated by the boiling water test.

*Example 8*

The conditions described in Example 4 are repeated except for adjustment of pH to 11.0 with diethyl ethanolamine. Titration shows 13 SH groups inserted and cross-linking resulted as demonstrated by the boiling water test.

*Example 9*

The conditions described in Example 1 are repeated except for the use of 5.0 grams of casein instead of gelatin with 600 milligrams of N-acetylhomocysteine thiolactone added and the adjustment of pH to 10.5 with triethylamine. Titration shows 23 equivalents —SH groups inserted per 100,000 grams of casein.

*Example 10*

The conditions described in Example 9 are repeated except the enzyme papain is substituted for casein. Titration shows insertion of 43 SH groups per 100,000 grams of papain or 8.5 SH groups per 20,000 molecular weight. In this manner 2–8.5 SH groups per 20,000 molecular weight could be introduced.

*Example 11*

The conditions described in Example 1 are successfully scaled up to large proportions as follows: Ten kilos of gelatin (bloom No. 250), 40 liters of solution are cooled to 25° C. after warming to 60° C., treated with 2500 ml. triethylamine and 1200 gms. of N-acetyl homocysteine thiolactone added with stirring over a 5 minute period. The solution is left for 35 minutes and then acidified in 4,800 ml. of 6 N HCl to pH 3.0. The solution is now sprayed into 200 liters of dry acetone cooled to —40° C, with solid carbon dioxide. The solution is allowed to warm up to —10° C. and the supernatant acetone is decanted. The precipitated powder is stirred with 100 liters of fresh acetone for half an hour, and the acetone layer again decanted. A second treatment with acetone gives a well powdered thiolated gelatin which is filtered off, washed twice with two cake volumes of acetone and dried in a vacuum drying oven at 50° C. to a fine flocculent powder. Yield 9,200 gms. The thiolated gelatin is readily soluble in warm water to a clear solution which contains 22 equivalents of sulfhydryl per 100,000 gms. of thiolated gelatin and a molar ratio of 3.4. Cross-linking can be demonstrated in the boiling water test.

*Example 12*

Example 1 was repeated at a temperature of 50° C. using a gelatin having a molecular weight as determined by intrinsic viscosity of about 100,000. By controlling the amounts of the thiolactone, products containing between 2–25 thiol groups per mol were obtained.

*Example 13*

Following the procedure of Example 1, the following materials were thiolated in turn: yeast ribonucleic acid; deoxyribonucleic acid, and commercial animal glue. The yeast ribonucleic acid, after the thiolation, contained 2–11 equivalent SH groups per 100,000 grams; the DNA, after the thiolation, contained 2–9.5 equivalent SH groups per $10^5$ grams and the glue contained 2–37 equivalent SH groups per $10^5$ grams. The glue could be cross-linked upon setting, forming a water and steam-resistant bond. In addition to the thiolation of the above-mentioned material, any polymer containing a free $NH_2$ group could be thiolated in a similar manner.

*Example 14*

5 grams of commercial vitamin A palmitate gelatin granules are suspended in 50 ml. distilled water at 10° C. and the pH is adjusted to 10.5–11.2 with triethylamine, and 150 mg. of N-acetylhomocysteine thiolactone is immediately added with stirring. The heterogeneous reaction mixture is stirred for 60 minutes at 10° C., after which 6 N hydrochloric acid is used to lower the pH to 2.5–3.5. The undissolved granules are recovered by filtration, washed with water, then dropped into boiling water. After 15 minutes, there is no evidence of dissolving while the control consisting of untreated granules dissolves almost instantaneously in the boiling water.

If it is desired to recover the above treated granules in dry state, they are first filtered and washed with water, then successively with 50% ethanol, 75% ethanol, and dry acetone, and finally dried in a desiccator overnight. The dry granules retain the property of substantial insolubility in boiling water.

The same results are obtained when the example is repeated but the pH adjusted, using sodium hydroxide, potassium hydroxide, sodium metasilicate, lime, trisodium phosphate, sodium carbonate, ammonia, magnesia, lithium hydroxide and ethylamine in turn, in place of the triethylamine.

*Example 15*

5 grams of 250 bloom pharmaceutical grade gelatin granules are suspended in 100 ml. of 5° C. distilled water and the pH adjusted to 10.5–11.2 with sodium hydroxide. 155 mg. of N-acetylhomocysteine thiolactone are added and the heterogeneous reaction mixture stirred for 60 minutes at the controlled 5° C. temperature. The pH is then adjusted to 2.5–3.5 with 6 N hydrochloric acid. The mixture is then filtered through paper and the recovered granules washed with cold tap water. When these recovered and treated granules are suspended in boiling water they do not dissolve for at least 15 minutes, while the untreated granules dissolve immediately.

Example 16

Several commercial gelatin capsules are dropped into ice water and stirred until they swell visibly. Ammonium hydroxide is added to bring the pH to 10.5–11.2 and N-acetylhomocysteine thiolactone added to a final concentration of 0.8 gram per liter. The reaction mixture is stirred slowly for 25 minutes, after which the capsules are recovered and washed with water, aqueous alcohol, and dried for several hours. The capsules are dropped into hot (60° C.) water in which they do not dissolve. Untreated gelatin capsules dissolve under these conditions within a few minutes.

Example 17

A 10% solution of gelatin is prepared by dissolving 10 grams of 250 bloom pharmaceutical grade gelatin in 100 ml. distilled water. The gelatin solution is then poured onto 3 inch square glass plates and allowed to harden in the refrigerator, thereby forming thin sheets of set gelatin on glass. A solution is prepared at 10° C., which consists of 0.3% N-acetylhomocysteine thiolactone (3 grams per liter) in distilled water. The gelatin coated plates then are immersed in this solution and the pH is adjusted to 11.0 with triethylamine. The solution is then agitated by gentle stirring. After 15 minutes the coated plates are removed from the solution and rinsed with a stream of distilled water acidified to pH 2–4 with commercial hydrochloric acid.

When the coated plates are dipped into boiling water the gelatin-treated film remains adhered to the glass and does not dissolve, while an untreated gelatin film dissolves immediately in the water.

Example 18

A pharmaceutical which is sensitive to the acid environment of the stomach, such as acriflavine, benzyl penicillin, vitamin $B_{12}$, follic acid, diethylstilbestrol, pancreatin and thyroid gland products, is encapsulated in the pharmaceutical grade gelatin in Example 17 and the capsules are treated with the thiolating solution as described. This results in an enteric coating. The retardation of the digestion of the treated gelatin by pepsin at a pH between 1 and 2 at 37° C., i.e. the approximate conditions within the stomach, is believed to arise primarily because of the altered water-solubility and melting characteristics of the treated gelatin surface. At 37° C. the untreated gelatin will rapidly swell, melt and dissolve, even in the absence of pepsin but the melting and hydration process permits maximum attack of the protein by the pepsin. No melting of the gelatin surface treated in accordance with the invention occurs, however, and swelling is significantly retarded. Hence only the exposed surface can be attacked by the enzyme and this proceeds slowly with respect to the average residence time in the stomach of each ingested capsule. On the other hand, the action of the proteolytic enzyme found in the intestine is relatively rapid, thus causing disintegration of the gelatin capsule and release of its contents.

N-acetyl homocysteine thiolactone was used as the thiolactone in the above examples in view of its availability and in order to show that the substitution of the thiolactone ring has no effect on the course of the reaction. In place of the N-acetyl homocysteine thiolactone, the unsubstituted gamma thiobutyrolactone, gammathiovalerolactone, gammacaprylthiolactone or the corresponding betathiolactones could be used with similar results. Similarly, the corresponding deltathiolactones, such as deltathiovalerolactone or deltathiocapryl lactone, could be used with comparable results.

In Example 6 cross-linking of the product could be effected by the addition of $Cu^{++}$ ions in excess of the amount chelated.

The thiolation of the enzyme in accordance with the invention, in addition to imparting the same reducing and chelating properties, increases the effective pH range of the enzyme activity.

Example 19

500 grams of commercial grade gelatin is ground to a particle size below about 150 mesh U.S. Standard screen and suspended in $\frac{1}{10}$ of a liter of distilled water, and the pH is adjusted to a value of 11 with lime. 2 grams of N-acetylhomocysteine thiolactone are added and the heterogeneous reaction mixture is stirred for an hour at a temperature of about 7° C. The pH is then adjusted to a value of about 3 with hydrochloric acid and the mixture filtered through a screen. The recovered, divided cross-linked gelatin is washed with water and used as a fining agent for the purification of beer during its production in the conventional manner.

The divided cross-linked gelatin is as effective as un-cross-linked gelatin in removing impurities from the beer, but there is a substantially lesser loss of the beer which is occluded with the fining agent after the same is settled and separated.

While the invention has been described in detail with reference to certain specific embodiments, various changes and modifications which fall within the spirit of the invention and scope of the appended claims will become apparent to the skilled artisan.

I claim:

1. Process for the thiolation of proteins having available free amino groups which comprises reacting such a protein with homocysteine thiolactone in the presence of a sufficient amount of a tertiary amine selected from the group consisting of trimethyl amine, triethyl amine, and diethyl ethanol amine to maintain the pH of the reaction mixture above the pH value of said free amino group of the protein and recovering the thiolated protein formed.

2. Process according to claim 1 in which said protein is a high bloom gelatin having a molecular weight of at least 100,000.

3. Process according to claim 2 in which said tertiary amine is triethyl amine and in which a pH is maintained at a value between about 10.5 and 11.

4. A high bloom thiolated gelatin of about 250 bloom thiolated with homocysteine thiolactone and containing from 2 to 25 free thiol groups per mol of gelatin.

5. High bloom cross-linked thiolated gelatin of about 250 bloom and having disulfide cross links formed by the oxidative union of from 2 to 25 free thiol groups per mol of gelatin, each of said thiol groups formed by the thiolation of the gelatin with homocysteine thiolactone.

6. High bloom cross-linked thiolated gelatin according to claim 4 in the form of an enteric coating on a pharmaceutical.

References Cited by the Examiner

UNITED STATES PATENTS

| 3,005,713 | 10/61 | Dersch | 260—117 |
| 3,028,308 | 4/62 | Zambito et al. | 260—117 |
| 3,106,483 | 10/63 | Kline et al. | 260—117 |
| 3,111,512 | 11/63 | Benesch et al. | 260—117 |

OTHER REFERENCES

Klotz: Journal of the American Chemical Society, vol. 78, pages 3802–03 (1959).

Benesch: Journal of the American Chemical Society, vol. 78, pages 1597–1599 (1956).

Benesch et al. (Ed.): Sulfur in Proteins, Academic Press, New York (1958) (pages 15–24 relied on, especially pages 17 and 18).

WILLIAM H. SHORT, *Primary Examiner.*

L. ZITVER, J. R. LIBERMAN, LEON J. BERCOVITZ,
*Examiners.*

UNITED STATES PATENT OFFICE
CERTIFICATE OF CORRECTION

Patent No. 3,171,831　　　　　　　　　　　　　　　　March 2, 1965

Bernard William Town

It is hereby certified that error appears in the above numbered patent requiring correction and that the said Letters Patent should read as corrected below.

Column 4, lines 69 and 70, for "stoichiometric" read -- stoichiometry --; column 5, line 63, for "about" read -- above --; column 6, lines 42 and 43, for "trimethylamine" read -- triethylamine --; column 7, line 67, for "large" read -- larger --; column 10, line 35, for "pH value" read -- pK value --; line 64, for "78" read -- 81 --.

Signed and sealed this 27th day of July 1965.

(SEAL)
Attest:

ERNEST W. SWIDER　　　　　　　　　　　　　　　　EDWARD J. BRENNER
Attesting Officer　　　　　　　　　　　　　　　　Commissioner of Patents